US012373746B2

(12) United States Patent
Tang et al.

(10) Patent No.: US 12,373,746 B2
(45) Date of Patent: Jul. 29, 2025

(54) DATA PROCESSING

(71) Applicant: MASHANG CONSUMER FINANCE CO., LTD., Chongqing (CN)

(72) Inventors: Chuan Tang, Chongqing (CN); Siyuan Wang, Chongqing (CN); Linghua Lu, Chongqing (CN); Meijin Chen, Chongqing (CN)

(73) Assignee: MASHANG CONSUMER FINANCE CO., LTD., Chongqing (CN)

( * ) Notice: Subject to any disclaimer, the term of this patent is extended or adjusted under 35 U.S.C. 154(b) by 116 days.

(21) Appl. No.: 18/399,666

(22) Filed: Dec. 28, 2023

(65) Prior Publication Data

US 2024/0242139 A1 Jul. 18, 2024

Related U.S. Application Data

(63) Continuation of application No. PCT/CN2023/070224, filed on Jan. 3, 2023.

(30) Foreign Application Priority Data

Apr. 26, 2022 (CN) .......................... 202210443663.5

(51) Int. Cl.
*G06Q 10/0631* (2023.01)
*G06F 9/54* (2006.01)
*G06F 16/901* (2019.01)

(52) U.S. Cl.
CPC ......... *G06Q 10/0631* (2013.01); *G06F 9/547* (2013.01); *G06F 16/9024* (2019.01)

(58) Field of Classification Search
CPC .. G06Q 10/0631; G06F 16/9024; G06F 9/547
USPC .............................................................. 705/7
See application file for complete search history.

(56) References Cited

U.S. PATENT DOCUMENTS 10,182,129 B1\* 1/2019 Peterson ............. G06F 11/3006
2004/0260667 A1\* 12/2004 Huelsman ............. G06N 5/025
706/47

OTHER PUBLICATIONS

"Airflow Directed Acyclic Graph" Published by MAT Journals (Year: 2019).\*
Extended European Search Report dated Jun. 18, 2024: Appln. No. 23794653.8.

\* cited by examiner

*Primary Examiner* — Zeina Elchanti
(74) *Attorney, Agent, or Firm* — PV IP PC; Wei Te Chung

(57) ABSTRACT

A data processing method includes: obtaining a directed acyclic graph for a target business and one or more target service output parameters for the target business in response to a business request for the target business; optimizing the directed acyclic graph based on context information, where the context information includes respective values of one or more service output parameters of each of one or more called microservices in a service pool; calling target microservices based on the optimized directed acyclic graph to obtain respective values of one or more service output parameters of each of the target microservices, and writing the obtained respective values of the one or more service output parameters of the each of the target microservices into the context information; and returning response data corresponding to the business request based on the context information and the one or more target service output parameters.

20 Claims, 11 Drawing Sheets

DATA PROCESSING

CROSS REFERENCE TO RELATED APPLICATIONS

This application is a continuation of International Application No. PCT/CN2023/070224, filed on Jan. 3, 2023, which claims priority to and the benefit of Chinese patent application Ser. No. 202210443663.5, filed on Apr. 26, 2022. The disclosures of the aforementioned applications are incorporated herein by reference in their entireties.

TECHNICAL FIELD

The present application relates to computer technologies, and more particularly, to data processing.

BACKGROUND

As an architecture scheme for constructing applications, microservices have a great advantage over conventional single applications and a Service-Oriented Architecture (SOA) in terms of dealing with complex business architectures and improving scalability and maintainability, and can be used to solve complexity problems caused by business growth. Although the microservices have significant advantages in many aspects, coordination between tens or hundreds of microservices may be required to complete a business request with the increase of business complexity.

In a business processing scheme, microservices required for implementing a business are classified according to service types of the microservices. Each type of microservices belong to one hierarchy for hierarchical calling, where microservices in a hierarchy will not be called until all microservices in a previous hierarchy have been called. After all microservices in all hierarchies have been called, results of one or more service output parameters in respective hierarchies are assembled, thereby completing this business request transaction. However, due to dependencies between different hierarchies, microservices in each hierarchy will not be called until all microservices in the previous hierarchy have been called. If any of the microservices in any of the hierarchies is called too slow, the overall data processing efficiency may be affected.

SUMMARY

In view of this, embodiments of the present application provide a data processing method and apparatus.

In a first aspect, an embodiment of the present application provides a data processing method, including: obtaining a directed acyclic graph for a target business and one or more target service output parameters for the target business in response to a business request for the target business; optimizing the directed acyclic graph based on context information, where the context information includes respective values of one or more service output parameters of each of one or more called microservices in a service pool; calling target microservices based on the optimized directed acyclic graph to obtain respective values of one or more service output parameters of each of the target microservices, and writing the obtained respective values of the one or more service output parameters of the each of the target microservices into the context information; and returning response data corresponding to the business request based on the context information and the one or more target service output parameters; where the directed acyclic graph includes nodes respectively corresponding to the target microservices and one or more directed edges between the nodes, each of the one or more directed edges represents a dependency between two of the nodes connected by the each of the one or more directed edges, and the target microservices include ones of microservices in the service pool required for processing the target business.

In a second aspect, another embodiment of the present application provides a data processing apparatus, including: a first obtaining module for obtaining a directed acyclic graph for a target business and one or more target service output parameters for the target business in response to a business request for the target business; an optimization module for optimizing the directed acyclic graph based on context information, where the context information includes respective values of one or more service output parameters of each of one or more called microservices in a service pool; a calling module for calling target microservices based on the optimized directed acyclic graph to obtain respective values of one or more service output parameters of each of the target microservices, and writing the obtained respective values of the one or more service output parameters of the each of the target microservices into the context information; and a response module for returning response data corresponding to the business request based on the context information and the one or more target service output parameters; where the directed acyclic graph includes nodes respectively corresponding to the target microservices and one or more directed edges between the nodes, each of the one or more directed edges represents a dependency between two of the nodes connected by the each of the one or more directed edges, and the target microservices include ones of microservices in the service pool required for processing the target business.

In a third aspect, yet another embodiment of the present application further provides an electronic device, including: a processor; and a memory storing instructions executable by the processor to perform the method of the first aspect.

In a fourth aspect, yet another embodiment of the present application provides a non-transitory computer readable storage medium storing instructions executable by a processor of an electronic device to perform the method of the first aspect.

DETAILED DESCRIPTION

Figure 1:
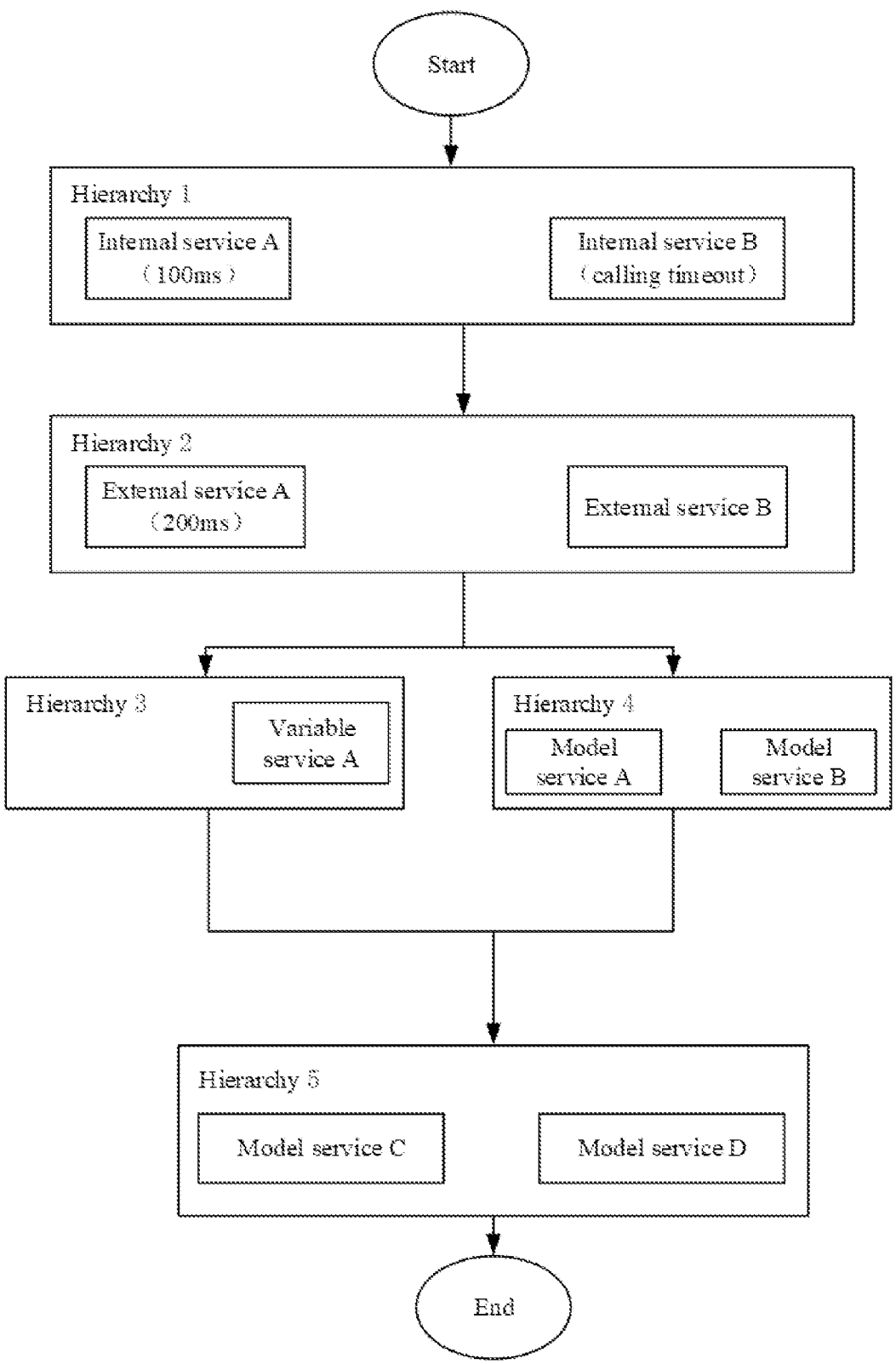
FIG. 1 is a schematic flow diagram of a data processing method based on hierarchical service calling.

Some embodiments of the present application will be described in detail below by referring to the accompany drawings. Obviously, the described embodiments are exemplary only and are not intended to limit the present application.

The terms "first", "second", etc. in the present application and claims are used to distinguish similar objects, and do not have to be used to describe a specific order or sequence. It should be understood that the data so used may be interchanged as appropriate so that the embodiments of the present application can be implemented in an order other than those illustrated or described herein. In addition, "and/or" in the present application and claims indicates at least one of the connected objects, and the character "/" generally indicates that the related objects have an "OR" relationship therebetween.

Introduction to Several Concepts:

Service-Oriented Architecture (SOA): it can perform distributed deployment, combination, and use of loosely coupled coarse-grained application components over a network according to requirements.

Enterprise Service Bus (ESB): it is a product of a conventional middleware technology in combination with technologies such as Extensible Markup Language (XML) and World Wide Web (Web) services. The ESB provides the most basic connection hub in the network and is an essential element for building an enterprise nervous system.

Microservice: it is a software development technology being a variant of the SOA-oriented architecture style, that promotes the division of a single application into a set of small services that are coordinated and interacted with each other to provide an ultimate value to the user.

Directed Acyclic Graph (DAG): it refers to a directed graph with no loop. If there is a non-DAG where one can start from point A, travel through points B and C sequentially, and then return to point A to form a loop, the non-DAG can become a directed acyclic graph by changing a direction of an edge from point C to point A to a direction from point A to point C. The number of spanning trees in a directed acyclic graph is equal to a product of respective indegrees of nodes each having a non-zero indegree.

As described above, completion of a business request often requires coordination between tens or hundreds of services with the increase of business complexity. Taking a financial risk control business as an example, it is often necessary to call thousands of different types of microservices when evaluating a user's credit risk, such as microservices involving internal data sources, microservices involving external data sources, microservices involving variables, and microservices involving models. An internal microservice may be preferentially called when a risk control business is processed generally, to obtain internal information such as basic information of a user and a blacklist. Then, an external microservice is called to access an external data source, for example external information, such as credit information, a credit score, a number home area, and the like, as authorized by the user. Further, a variable microservice and a basic model microservice are called to transfer the obtained internal information and external information to the corresponding variable or the basic model for processing. Thereafter, a fusion model microservice is called to transfer a processing result to a fusion model for fusion processing, and so on. This way, calling of a final fusion model microservice often needs to rely on service output parameter results of the previous large number of microservices.

Illustratively, according to a business processing scheme of hierarchical service calling, each of a microservice involving an internal data source, a microservice involving an external data source, a microservice involving a variable, and a microservice involving a model belongs to respective one of hierarchies, respectively. As shown in FIG. 1, an internal service A and an internal service B belong to a hierarchy 1, an external service A and an external service B belong to a hierarchy 2, a variable service A belongs to a hierarchy 3, a model service A and a model service B belong to a hierarchy 4, and a model service C and a model service D belong to a hierarchy 5. Assuming that calling timeout occurs in the internal service B in the hierarchy 1, since the microservices in the hierarchy 2 depends on a calling result of the microservices in the hierarchy 1 and respective ones of the microservices in the hierarchy 3 to the hierarchy 5 indirectly depend on the calling result of the microservices in the hierarchy 1, calling of the microservices in the hierarchy 2 and the respective ones of the microservices in the hierarchy 3 to the hierarchy 5 all may need to wait until the internal service B in the hierarchy 1 has been called, thereby causing a calling speed of the microservices in the downstream hierarchy of the hierarchy 1 to be slowed down, and finally affecting the overall business processing efficiency.

In view of this, embodiments of the present application propose some data processing schemes. For example, target microservices required for processing a target business and dependencies between the target microservices may be expressed in the form of a directed acyclic graph. Each node in the directed acyclic graph corresponds to one of the target microservices, and each of one or more directed edges indicates a dependency between the target microservices corresponding to two of the nodes connected by the each of the one or more directed edges, which is equivalent to taking each of the target microservices as an independent unit. The target microservices required for processing the target business can be called based on the directed acyclic graph, so that a downstream target microservice to be called can be obtained immediately after all of the target microservices have been called, and thus waiting time in the hierarchical calling scheme can be omitted, and business processing efficiency can be improved. On this basis, respective values of one or more service output parameters of each of the called microservices in the service pool may be written into the context information, the directed acyclic graph is optimized based on the respective values of the one or more service output parameters of each of the called microservices in the context information before the target microservices required for the target business are called based on the directed acyclic graph, and the business request is responded to based on the context information and the target service output parameters for the target business. This way, it is possible to avoid the situation where the target microservices that have already been invoked, and have already obtained the respective values of the one or more service output parameters are repeatedly called, so that the number of callings of the target microservices can be reduced, the consumption of the processing resources can be reduced, and the data processing efficiency can be improved.

It should be understood that the data processing method provided in the embodiments of the present application may be executed by an electronic device or software installed in the electronic device, and specifically may be executed by a terminal device or a server device.

Some embodiments of the present application will be described in detail below by referring to the accompany drawings.

Figure 2:
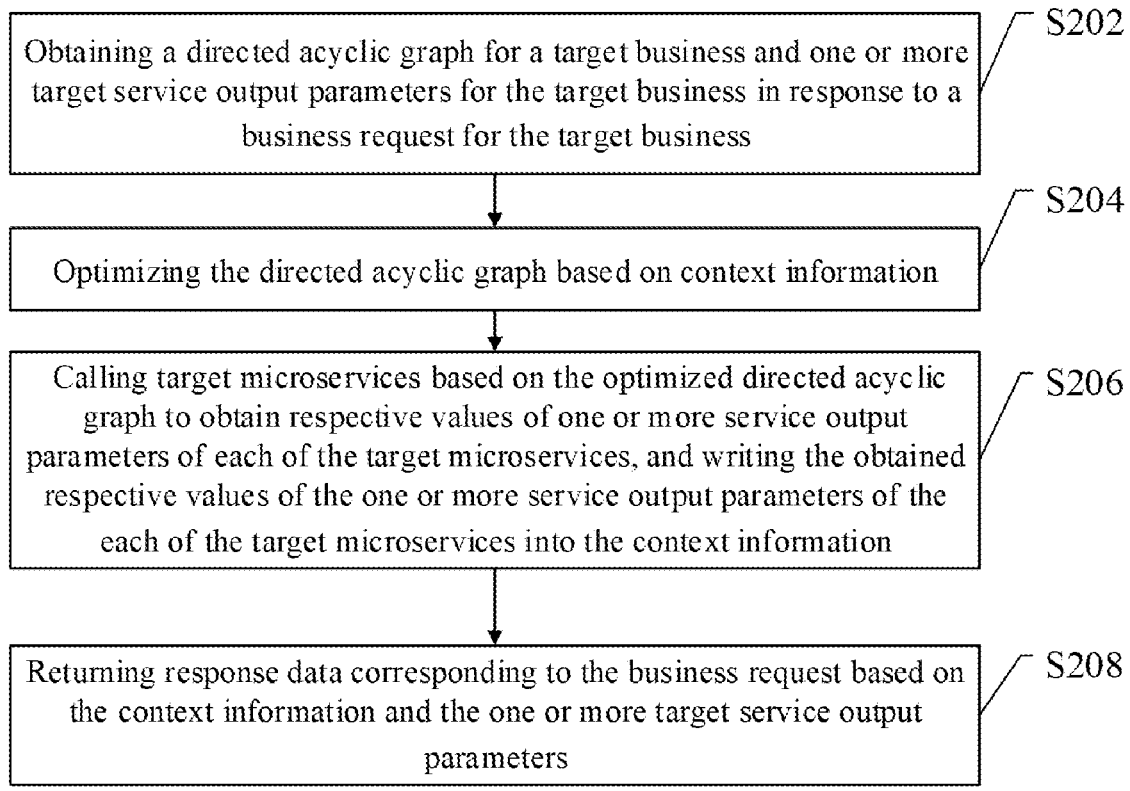
FIG. 2 is a schematic flow diagram of a data processing method according to some embodiments of the present application.

Referring to FIG. 2, which is a schematic flow diagram of a data processing method according to some embodiments of the present application. The method may include steps S202-S208.

At step S202, a directed acyclic graph for a target business and one or more target service output parameters for the target business may be obtained in response to a business request for the target business.

The directed acyclic graph for the target business includes nodes respectively corresponding to the target microservices and one or more directed edges between the nodes, where each of the one or more directed edges represents a dependency between two ones of the nodes connected by the each of the one or more directed edges. The target microservices is microservices in a service pool required for processing the target business. It can be understood that a dependency between different ones of the nodes is a dependency between target microservices corresponding to the different nodes. For example, the node A depends on the node B, that is, the target microservice corresponding to the node A depend on the target microservice corresponding to the node B.

Each business has respective requirement configuration information. The requirement configuration information of the target business refers to information that is preconfigured for the target business and is used to reflect a business requirement of the target business. Specifically, the requirement configuration information of the target business may include one or more target service output parameters for the target business, which are used to represent output parameter(s) required for processing the target business. Of course, optionally, the requirement configuration information of the target business may further include one or more target service input parameters for the target business, which are used to represent input parameter(s) required for processing the target business.

For example, for a risk control anti-fraud business, one or more target service input parameters of the business may include historical credit related data authorized by an object to be detected, and one or more target service output parameters of the business may include a risk control result indicating whether a risk control fraud behavior exists or not, and the like. For another example, for a commodity recommendation business, one or more target service input parameter of the business may include a geographical location authorized by a user to be recommended, a history consumption record, and the like, and one or more target service output parameters of the business may include commodity related information of a recommended commodity, and the like. For yet another example, for a credit line evaluation business, one or more target service input parameters of the business may include credit related data authorized by the user to be evaluated and the like, and one or more target service input parameters of the business may include a credit line obtained for the user to be evaluated and the like.

In the embodiment of the present application, the directed acyclic graph for the target business may be constructed in any suitable manner according to actual requirements. In an alternative implementation, to quickly establish a directed acyclic graph capable of accurately reflecting the dependency between the target microservices, the directed acyclic graph corresponding to the target business may be constructed based on the requirement configuration information of the target business and the service configuration information of the microservices in the service pool. The service pool includes a plurality of microservices that have been pre-developed and configured, where different microservices are used to implement different functions, and the different microservices are coordinated and interacted with each other to process corresponding business. The service configuration information of each of the microservices may include, but not limited to, metadata, an access policy, and the like of the microservice. The metadata of the microservice may include, but not limited to, one or more service input parameters, one or more service output parameters, a calling address, a calling manner, and the like of the microservice. The access policy of the microservice may specifically include, but not limited to, call timeout time, retry times, preset initial values of the one or more service input parameters, preset initial values of one or more service output parameters, a fusing policy, a degradation policy, and the like of the microservice.

Figure 3:
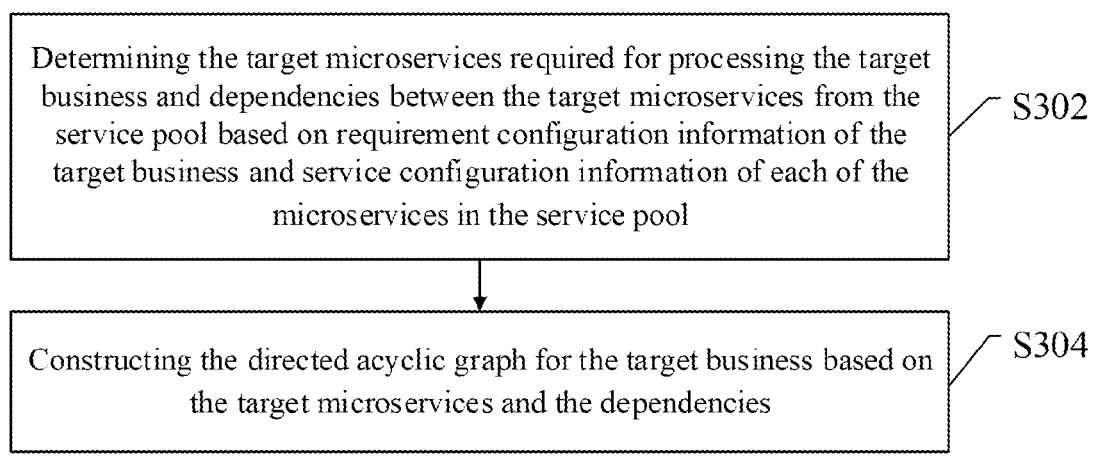
FIG. 3 is a schematic flow diagram of a method of constructing a directed acyclic graph according to some embodiments of the present application.

For example, the data processing method according to the embodiment of the present application may further include: before the step S202, constructing a directed acyclic graph with steps S302~S304 as shown in FIG. 3.

At step S302, the target microservices required for processing the target business and dependencies between the target microservices may be determined from the service pool based on requirement configuration information of the target business and service configuration information of each of the microservices in the service pool.

Alternatively, considering the case where one or more service output parameters of one of the target microservices are either respective ones of the target service output parameters for the target business, or one or more service input parameters of another one of the target microservices. In order to ensure accuracy of a dependency between the target microservices required for processing the target business, following processes may be repeatedly performed until all of the target microservices required for processing the target business have been obtained: determining, based on the one or more service output parameters of each of the microservices in the service pool, one of the microservices in the service pool having the one or more target service output parameters as one of the target microservices required for processing the target business; further, taking the determined one of the target microservices as a second start target microservice; determining one of the microservices in the service pool having one or more service output parameters which belong to one or more service input parameters of the second start target microservice, as a second end target microservice on which the second start target microservices depend; and taking the second end target microservice as a new second start target microservice.

It should be noted in a practical application that there may be a plurality of microservices selected from the service pool and required for obtaining the target service output parameters. In this case, these selected microservices may be determined as target microservices required for processing the target business, and for each of the target microservices, the target microservice is used as the second start target microservice, and the second end target microservice on which the target microservice depends is obtained by the above operation.

Figure 4:
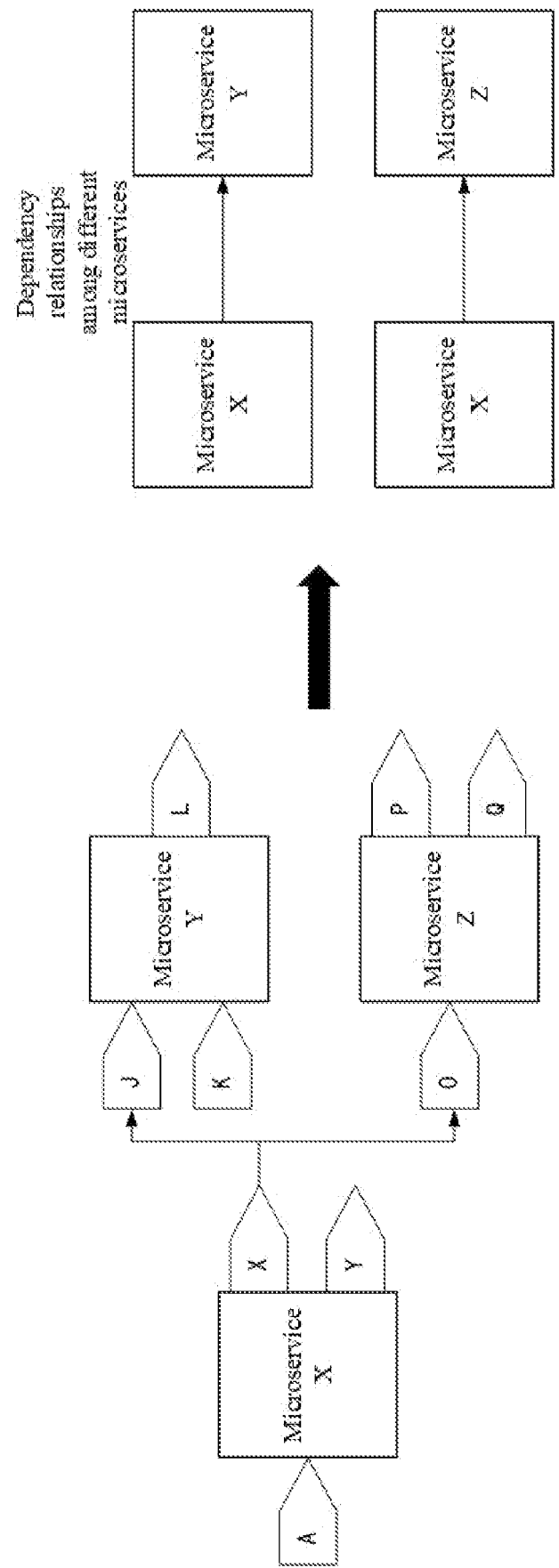
FIG. 4 is a schematic diagram of dependencies between microservices according to some embodiments of the present application.

For example, as shown in FIG. 4, if the target service output parameters for the target business include a service output parameter L, a microservice output parameter P, and a service output parameter Q, the service output parameter of a microservice Y is a service output parameter L, and service output parameters of the microservice Z include the service output parameter P and the service output parameter Q, then the microservices Y and Z may both be determined as the target microservices required for processing the target business. Further, using either of the microservice Y and the microservice Z as the second start target microservice, respectively, it is found from the service pool that the service output parameter X of the microservice X is not only used for the service input parameter J of the microservice Y, but also used for the service input parameter O of the microservice Z, whereby it can be determined that the microservice Y depends on the microservice X, and the microservice Z also depends on the microservice X. That is, the target microservices required for processing the target business include the microservice X, the microservice Y, and the microservice Z, where the microservice Y depends on the microservice X, and the microservice Z depends on the microservice X.

Optionally, in order to quickly obtain target microservices required for processing the target business and dependencies between the target microservices, and to prevent the above-mentioned process from falling into a dead cycle and affecting subsequent business processing, FIG. 4 is still taken as an example. After determining that both the microservice Y and the microservice Z depend on the microservice X, if the service input parameter A of the microservice X belongs to the target service input parameter for the target business, then a recursive query operation is stopped. Otherwise, the microservice X is still used as a new second start target microservice, and the above process is repeated until the determined service input parameter of the target microservice belongs to the target service input parameter for the target business.

It should be understood in the above-mentioned solution that it is only necessary to preconfigure one or more target service output parameters for the target business, preconfigure one or more service output parameters and one or more service input parameters of each of the microservices, and save the microservice in the service pool. That is, all the target microservices required for processing the target business and the dependencies between the target microservices can be automatically obtained in a recursive query manner. This manner is simple in implementation and high in efficiency, and does not require manual participation, so that errors introduced in the manual participation process can be eliminated and labor costs can be saved.

At step S304, the directed acyclic graph for the target business may be constructed based on the target microservices and the dependencies.

In order to clearly and intuitively reflect the dependencies between the target microservices required for processing the target business to enable these target microservices to be accurately called in sequence during business processing, the directed acyclic graph for the target business can be constructed by constructing the nodes respectively corresponding to the target microservices required for processing the target business based on the target microservices; and constructing one of the one or more directed edges between every two of the nodes respectively corresponding to two of the target microservices dependent on each other based on the dependencies.

Figure 5:
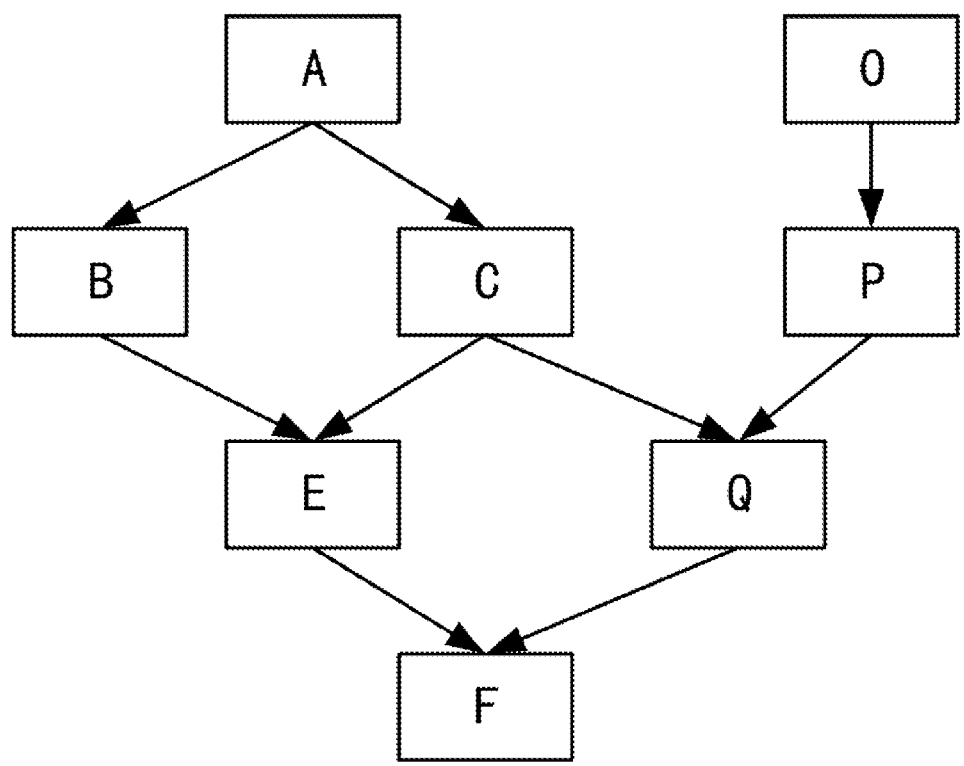
FIG. 5 is a schematic diagram of a directed acyclic graph for a target business according to some embodiments of the present application.

For example, if the target microservices required for processing the target business include a microservice A, a microservice B, a microservice C, a microservice E, a microservice F, a microservice O, a microservice P, and a microservice Q, where the microservice F depends on the microservice E and the microservice Q, the microservice E depends on the microservice B and the microservice C, the microservice B and the microservice C both depend on the microservice A, the microservice Q depends on the microservice C and the microservice P, and the microservice P depends on the microservice Q, the directed acyclic graph shown in FIG. 5 can be constructed by the above described implementation.

It should be understood that the pre-developed and configured microservices may be added into the service pool to enable each of the microservices to be used as a separate unit and managed uniformly, so that multiple uses of one access can be realized, thereby avoiding repeated access to the microservices, and reducing consumption of processing resources. When the directed acyclic graph for the target business is constructed, target microservices required for processing the target business and dependencies between the target microservices can be determined based on requirement configuration information of the target business and the one or more service input parameters, and the one or more service output parameters of the microservices in the service pool according to service configuration information such as a business requirement of the target business, and preconfigured one or more target service output parameters for the target business. Then, the directed acyclic graph for the target business can be automatically constructed based on the dependencies between the target microservices. This way, the directed acyclic graph for the target business is simple in implementation and high in efficiency, manual participation is not required, errors introduced in the manual participation can be eliminated, and labor cost is saved. Further, the obtained directed acyclic graph can clearly and visually reflect the dependencies between the target microservices required for processing the target business. Also, the directed acyclic graph is beneficial in becoming more convenient and fast in calling the microservices in a subsequent service processing process, which may be beneficial in improving business processing efficiency.

In a practical application, after the directed acyclic graph for the target business is constructed, the directed acyclic graph and the requirement configuration information corresponding to the target business can be packaged and integrated into a business data file of the target business, and the business data file is placed on a business execution terminal, such as a business server used for executing the target business. When receiving a business request of a business party for the target business, the business execution terminal loads the business data file of the target business into a memory, and obtains the directed acyclic graph and the requirement configuration information corresponding to the target business by analyzing the business data file. Certainly, the service configuration information of the target microservices required for processing the target business may be packaged and integrated in the business data file of the target business together, and the business execution terminal may further obtain the service configuration information of the target microservices required for processing the target business by parsing the business data file, so as to better perform business processing in combination with the service configuration information of the target microservices.

At step S204, the directed acyclic graph may be optimized based on context information.

In the embodiments of the present application, the context information includes respective values of one or more service output parameters of each of one or more called microservices in the service pool.

Considering the situation where the respective values of the one or more service output parameters of each of the one or more called microservices in the service pool can be directly used by other one or more of the microservices that depend on the microservice. In order to avoid repeated calling of the called microservices during the business processing to reduce scheduling processing resources and improve business processing efficiency, in an alternative implementation, the directed acyclic graph for the target business can be optimized based on the respective values of the one or more service output parameters of each of the one or more called microservices in the context information. Specifically, for example, if the respective values of one or more service output parameters of one of the target microservices corresponding to one of the nodes in the directed acyclic graph exists in the context information, other one or more of the nodes on which the one of the nodes depends may be clipped to obtain the optimized directed acyclic graph.

Figure 6:
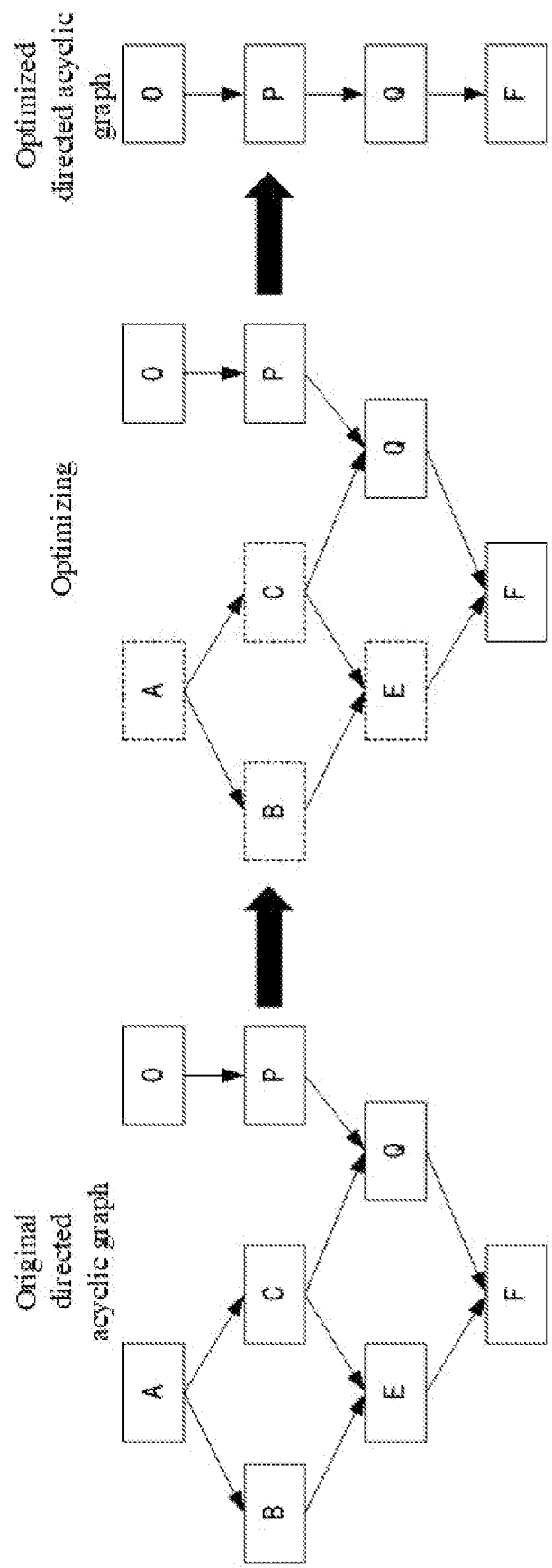
FIG. 6 is a schematic diagram of a process of optimizing a directed acyclic graph according to some embodiments of the present application.

For example, as shown in FIG. 6, if it is queried that the respective values of the one or more service output parameters of one of the target microservices corresponding to the node E in the original directed acyclic graph already exists in the context information, then it indicates that the target microservice corresponding to the node E has been called, and the node B and the node C on which the node E directly depends, and the node A on which the node B and the node C respectively depend (that is, the nodes on which the node E indirectly depends) can be clipped to obtain an optimized directed acyclic graph shown on the right side of FIG. 6.

At step S206, target microservices may be called based on the optimized directed acyclic graph to obtain respective values of one or more service output parameters of each of the target microservices, and the obtained respective values of the one or more service output parameters of the each of the target microservices may be written into the context information.

After the optimized directed acyclic graph is obtained, the target microservices required for processing the target business may be sequentially called based on the dependencies between the target microservices corresponding to the nodes indicated by the directed acyclic graph to obtain the respective values of the one or more service output parameters corresponding to each of the target microservices.

By writing the respective values of the one or more service output parameters of each of the one or more called target microservices into the context information, the respective values of the one or more service output parameters of the target microservice can be reused by other businesses without repeatedly calling the target microservices during the data processing. This way, multiple uses of one successful calling can be realized, thereby reducing the number of times the microservices is called, the consumption of processing resources, and the access cost of the external data source.

Figure 7:
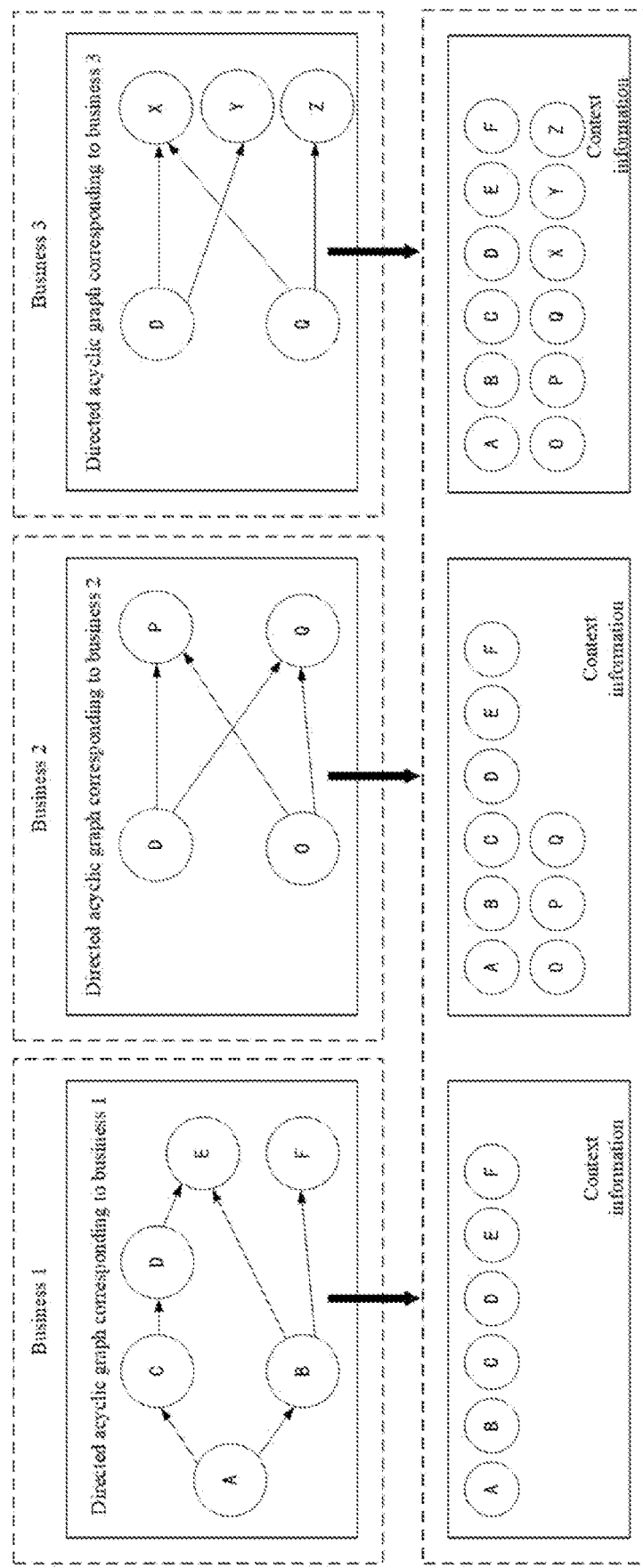
FIG. 7 is a schematic diagram of a microservice calling process based on a directed acyclic graph according to some embodiments of the present application.

For example, as shown in FIG. 7, in a processing process of the business 1, after calling of microservices is performed based on the directed acyclic graph for the business 1, the respective values of the one or more service output parameters of each of the microservices A-F can be obtained to write the obtained respective values of the one or more service output parameters into the context information. For the business 2, since the microservice D is also required for processing the business 2 and the respective values of the one or more service output parameters of the microservice D already exists in the context information, the microservice D does not need to be called again, but only microservice O, microservice P and microservice Q are called in the processing process of the business 2, and the obtained respective values of the one or more service output parameters are written into the context information. For the business 3, since the microservices D and Q are also required for processing the business 3 and the respective values of the one or more service output parameters of either of the microservices D and Q already exists in the context information, the microservices D and O need not be called again, but only the microservice X, the microservice Y and the microservice Z are called in the processing process of the business 3, and the obtained respective values of the one or more service output parameters are written into the context information.

To accurately and efficiently call the target microservices, in an alternative implementation, the step S206 may be implemented by: repeatedly performing following operations until all of the target microservices required for processing the target business has been called: selecting, from the optimized directed acyclic graph, one of the nodes whose indegree meets a preset calling condition as a first start node, and determining other one of the nodes in the optimized directed acyclic graph depending on the first start node as a first end node; calling a first start target microservice to obtain respective values of one or more service output parameters of the first start target microservice, where the first start target microservice is one of the target microservices corresponding to the first start node; and in response to determining that the first start target microservice is successfully called, updating an indegree of the first end node. In the directed acyclic graph, the indegree of a node refers to a sum of times that the node serves as an end point of a directed edge. The preset calling condition may be set according to actual requirements. For example, the indegree is 0.

Taking the optimized directed acyclic graph shown in FIG. 6 as an example. Assuming that the preset calling condition includes the indegree of 0, the node O may be used as the first start node, a target microservice corresponding to the node O may be called to obtain and write respective values of one or more service output parameters of the target microservice into the context information, and then the indegree of the node P depending on the node O is reduced by 1. In this case, the indegree of the node P becomes 0. In a similar manner, the node P is used as a new first start node, and the above process is repeated until all of the target microservices corresponding to node F have been called.

It can be understood that each of the microservices is called based on the indegree of respective one of the nodes in the directed acyclic graph, so that a downstream target microservice to be called can be obtained immediately after respective ones of the target microservices corresponding to each of the nodes have been called. This way, the waiting time in the hierarchical calling scheme can be omitted, and business processing efficiency can be improved.

In another alternative implementation, consider a case where a target microservice being not successfully called may occur in the process of calling the target microservice. In order to minimize the impact on the overall business processing efficiency due to an individual microservice being not successfully called, if the first start target microservice is not successfully called, obtaining respective types of one or more service input parameters of a first end target microservice, where the respective types of the one or more service input parameters include a type of necessary service input parameter and a type of unnecessary service input parameter, and the first end target microservice is one of the target microservices corresponding to the first end node; and based on the respective types of the one or more service input parameters of the first end target microservice, determining whether the one or more service output parameters of the first start target microservice belong to the type of necessary service input parameter of the first end target microservice. If the one or more service output parameters of the first start target microservice belong to the type of necessary service input parameter of the first end target microservice, the indegree of the first end node remains unchanged, otherwise, a subsequent operation continues.

It should be noted in a practical application that there may be multiple first end nodes depending on the first start node. In this case, after the first start target microservice has been called, the indegree of each of the first end nodes may be updated respectively.

Figure 8:
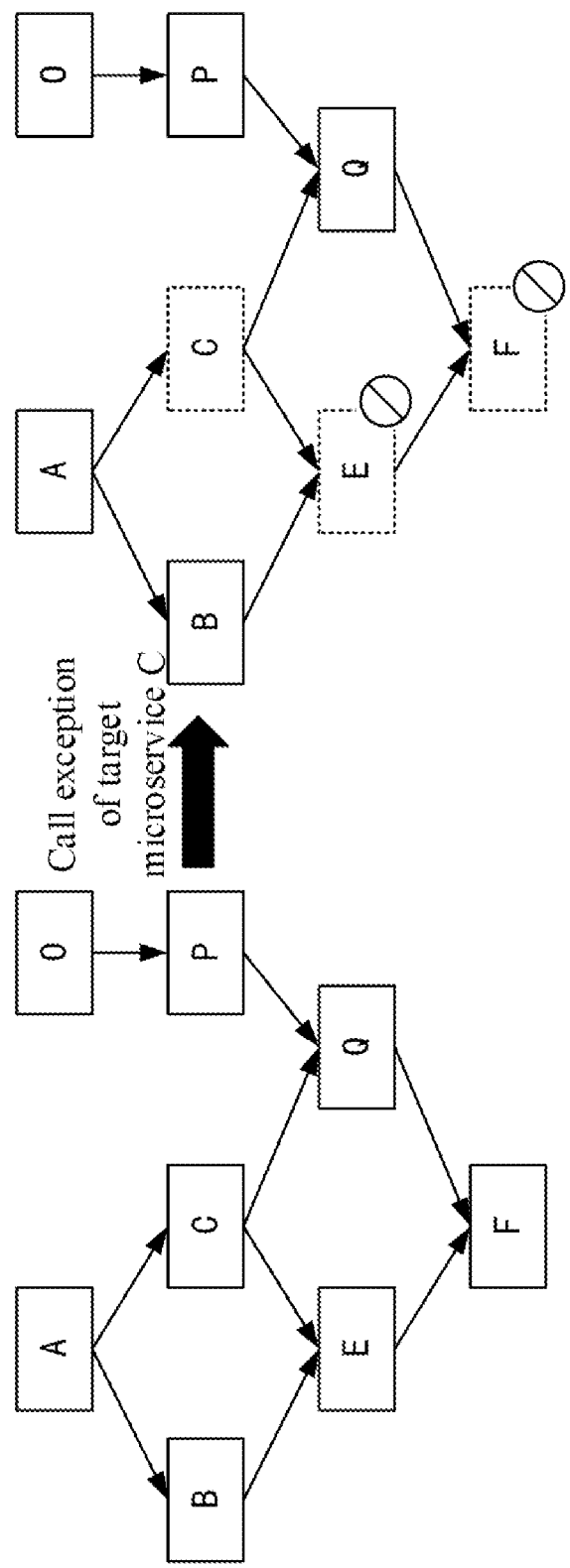
FIG. 8 is a schematic diagram of an exception call processing method according to some embodiments of the present application.

For example, as shown in FIG. 8, in a case that the target microservice corresponding to the node C (hereinafter referred to as the target microservice C) is not successfully called, if one or more service output parameter of the target microservice C belong to the type of necessary service input parameters of the target microservice corresponding to the node E (hereinafter referred to as the target microservice E), updating of the indegree of the node E is stopped to stop calling the target microservice E. The one or more service output parameters of the target microservice E belong to the types of the necessary service input parameter of the target microservice corresponding to the node F (hereinafter referred to as the target microservice F), and in a case that the target microservice E cannot be called, the target microservice F cannot be called. If the one or more service output parameters of the target microservice C belong to the type of the unnecessary service input parameter of the target microservice corresponding to the node Q (hereinafter referred to as the target micro service Q), the indegree of the node Q is updated, so that a calling operation of the target microservice Q can be normally performed subsequently.

It can be understood that the one or more service output parameters of some of the target microservices do not belong to the type of the necessary service input parameter for the downstream target microservice. For example, the one or more service output parameters of an internal microservice are only used to improve the accuracy of the service output parameter result of the downstream external microservice, and has no decisive effect on the final service processing result. If the current processing method of repeatedly attempting to call the target microservice is adopted when service exception occurs in such a target microservice, the entire business processing speed will be slowed down, which may be not worth the candle. In view of this, in the above-described implementation, when the target microservice is called based on the optimized directed acyclic graph, it is determined whether to continue to call a downstream target microservice based on whether the one or more service output parameters of the target microservice being not successfully called belong to the type of the necessary service input parameter of the downstream target microservice. Compared with the current processing method of repeatedly attempting to call the target microservice, it is possible to minimize the impact on the overall service processing efficiency caused by the individual microservice being not successfully called.

In yet another implementation, in order to avoid the influence on the entire business processing process caused by calling the microservice in which call exception frequently occurs, a fusing process may also be performed on the target microservice in which the call exception frequently occurs according to a fusing policy configured in advance for the target microservice during calling of the target microservice. Here the fusing policy may include a preset fusing condition and a fusing processing operation corresponding to the preset fusing condition.

Specifically, at the step S206, a history call record for the first start target microservice may be obtained before calling the first start target microservice. If the history call record for the first start target microservice meets the preset fusing condition, the calling of the first start target microservice can be suspended. If the preset fusing condition may be set according to actual requirements, and different target microservices may correspond to the same preset fusing conditions, or the different target microservices may correspond to different preset fusing conditions.

For example, the history call record for the microservice may include history call times, a call execution result of each call time, and the like of the microservice, and the preset fusing condition may include that a proportion of the exception call times to the history call times exceeds a preset proportion threshold. If it is determined, based on the history call record for the first start target microservice, that the proportion of exception call times of the first start target microservice to the history call times of the first start target microservice exceeds the preset proportion threshold, the calling of the first start target microservice may be suspended, until the calling of the first start target microservice may be restarted when the first start target microservice resumes to not meet the preset fusing condition.

In still another implementation, in order to avoid the influence on the entire business processing process caused by calling the microservice in which the call exception frequently occurs, a degradation processing may be further performed on the target microservice in which the call exception frequently occurs according to a degradation strategy configured in advance for the target microservice during calling of the target microservice, where the degradation strategy may include a preset degradation condition and a degradation processing operation corresponding to the preset degradation condition.

Specifically, at the step S206, the history call record for the first start target microservice may be obtained before calling the first start target microservice. If the history call record for the first start target microservice meets the preset degradation condition, the calling of the first start target microservice is suspended and a call degradation processing corresponding to the first start target microservice is performed, based on the degradation policy corresponding to the first start target microservice. The call degradation processing includes at least one of: calling a standby microservice of the microservices in the service pool corresponding to the first start target microservice; or taking respective preset initial values of the one or more service output parameters of the first start target microservice as respective values of one or more service input parameters of a first end target microservice, where the first end target microservice is one of the target microservices corresponding to the first end node.

For example, the history call record for the microservice may include history call times, a call execution result of each call time, and the like of the microservice, and the preset degradation condition may include that a proportion of the exception call times to the history call times exceeds a preset proportion threshold. If it is determined, based on the history call record for the first start target microservice, that the proportion of exception call times of the first start target microservice to the history call times of the first start target microservice exceeds the preset proportion threshold, the calling of the first start target microservice can be suspended. Also, a standby microservice of the microservices in the service pool corresponding to the first start target microservice can be called in turn, until the calling of the first initial target microservice is switched back to when the first start target microservice resumes to not meet the preset degradation condition. If the first start target microservice is not configured with respective standby microservice of the microservices, preset initial values of the one or more service output parameters of the first start target microservice are directly configured as the service input parameters of the first end target microservice.

In other alternative implementations, to avoid the influence on the entire data processing process caused by calling the microservice in which the call exception frequently occurs, an access policy such as call timeout time, retry times, preset initial values of one or more service output parameters, and preset initial values of one or more service input parameters may also be configured for each of the target microservices. Also, the target microservice in which the call exception frequently occurs may be further processed according to the above access strategy configured in advance for the target microservice during calling of the target microservice, where the degradation strategy may include a preset processing condition and a processing operation corresponding to the preset processing condition.

For example, if the call time of the first start target microservice exceeds the call timeout time of the first start target microservice, the first start target microservice may be degraded according to the degradation policy. If the degradation process fails, the preset initial values of the one or more service output parameters of the first start target microservice are directly configured as the respective values of the one or more service input parameters of the first end target microservice. If the preset initial values of the one or more service output parameters of the first start target microservice are not configured, the preset initial values of the one or more service input parameters of the first target micro service are directly used when the first end target microservice is called.

In another example, consider the case where some of the microservices will return to normal after retries due to network jitter at that time. If the first start target microservice is not successfully called, the first start target microservice is called again until retry times of the first start target microservice are reached.

At step S208, response data corresponding to the business request may be returned based on the context information and the one or more target service output parameters for the target business.

Specifically, respective values of the one or more target service output parameters may be searched from the context information based on the one or more target service output parameters for the target business to assembly the searched values into final response data and return the final response data to the business party.

In the data processing method provided in the embodiments of the present application, the target microservices required for processing a target business and dependencies between the target microservices are expressed in the form of a directed acyclic graph, where each node corresponds to one of the target microservices, and each of one or more directed edge between the nodes indicates a dependency between the target microservices corresponding to two ones of the nodes connected by the each of the one or more directed edges. This is equivalent to taking each of the target microservices as an independent unit. The target microservices required for processing the target business are called based on the directed acyclic graph, so that a downstream target microservice to be called can be obtained immediately after all of the target microservices have been called, and thus waiting time in the hierarchical calling scheme can be omitted, and business processing efficiency can be improved. On this basis, the respective values of the one or more service output parameters of each of the called microservices in the service pool are written into the context information, the directed acyclic graph is optimized based on the respective values of the one or more service output parameters of each of the called microservices in the context information before the target microservices required for processing the target business are called based on the directed acyclic graph, and the business request is responded to based on the context information and the one or more target service output parameters for the target business. This way, the target microservice that has been called and obtained values of the one or more service output parameters is prevented from being repeatedly called, thereby reducing call times of the target microservice, reducing consumption of processing resources, and further improving data processing efficiency.

Figure 9:
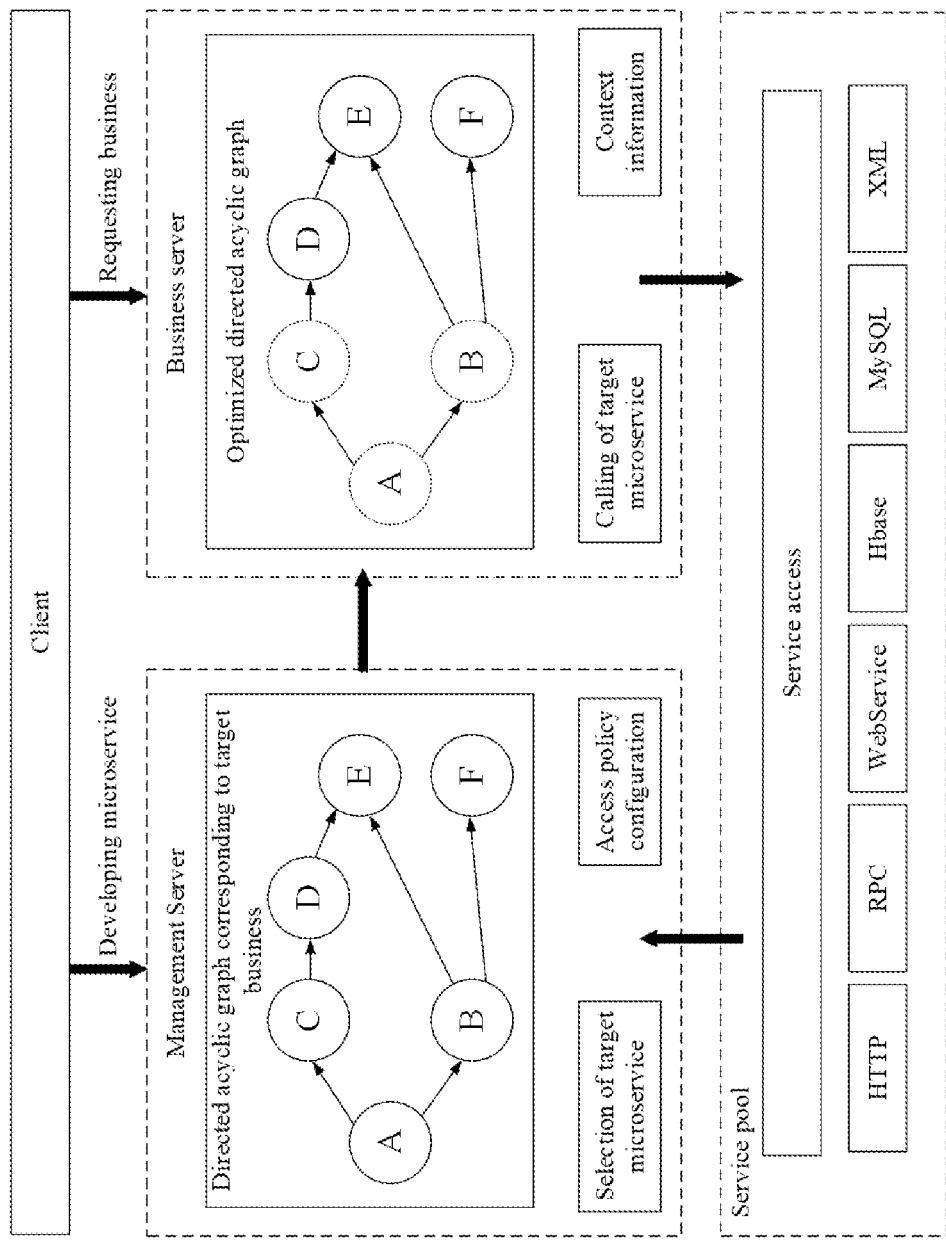
FIG. 9 is a schematic diagram of an application scenario where a data processing method is applicable according to some embodiments of the present application.

In a practical application scenario of the data processing method provided in the embodiments of the present application, information for reflecting a business requirement of a target business may be configured for the target business by a developer based on the business requirement of the target business. For example, the information includes, but not limited to, one or more target service output parameters and one or more target service input parameters for the target business, and after development of the microservices and setting of the service configuration information, the microservices are stored in a service pool for subsequent use, thereby completing access of the microservices. Then, a manager constructs a directed acyclic graph corresponding to the target business based on the requirement configuration information of the target business and the service configuration information of each of the microservices in the service pool and issues the directed acyclic graph to a business server, and the business server responds to the business request for the target business based on the directed acyclic graph corresponding to the target business. As shown in FIG. 9, the application scenario includes a client, a management server, a business server, and a service pool.

Figure 10:
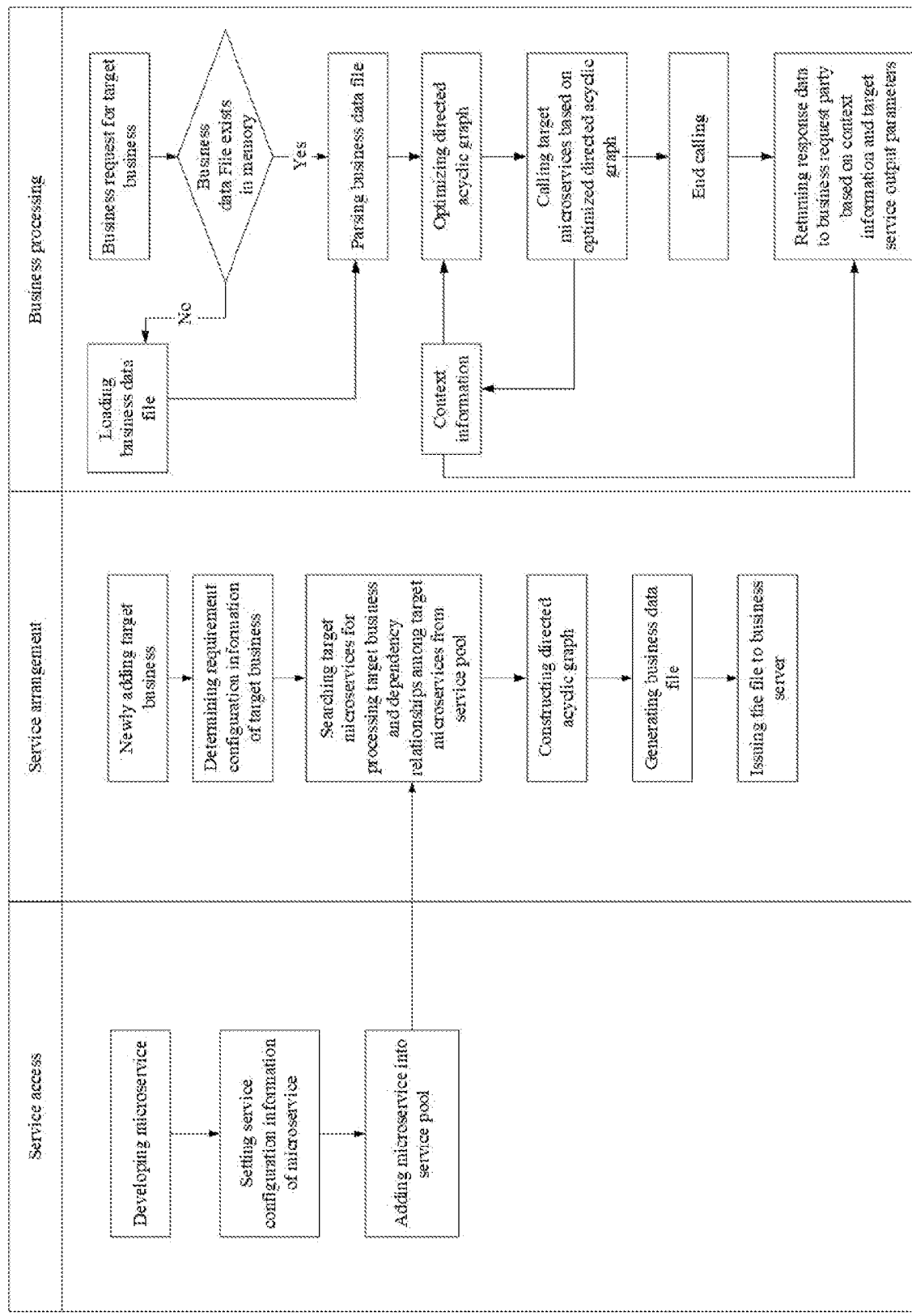
FIG. 10 is a schematic flow diagram of a data processing method according to some embodiments of the present application.

The client may present an operation interface for a developer to access microservices. As shown in FIG. 10, a developer may develop microservices capable of processing different functions, and set corresponding service configuration information for each of the microservices. The service configuration information of each of the microservices may include, but not limited to, metadata, an access policy, and the like. The metadata information of the microservice may specifically include, but not limited to, one or more service input parameters, one or more service output parameters, a call address, a call mode, and the like. The access policy of the microservice may specifically include, but not limited to, call timeout time, retry times, preset initial values of the one or more service input parameters, preset initial values of the one or more service output parameters, a fusing policy, a degradation policy, and the like. Then, the developer can store the respective one of the microservices and the service configuration information of the microservice into the service pool via the client for subsequent use, thereby completing the service access.

It should be noted in a practical application that the microservices in the service pool may be divided into internal microservices, external microservices, variable microservices, and model microservices and the like according to different data sources, and the microservices in the service pool may be divided into Hyper Text Transfer Protocol (HTTP) microservices, Remote Procedure Call (RPC) microservices, MySQL microservices, Hbbase microservices, and the like according to different data access modes. Considering particularity of some data access, the service configuration information of each of the microservices may further include a special processing and a parameter conversion strategy for the microservice, such as an authentication key setting corresponding to calling of an external microservice, or a conversion of the service output parameter result of the external microservice from the form of "A, B, C" to the form of a list [A, B, C], etc.

As shown in FIG. 10, in a service arrangement process, a business party may provide requirement configuration information of a target business to a management server via a client, where the requirement configuration information may include, but not limited to, one or more target service input parameters and one or more target service output parameters for the target business. The management server may determine the target microservices required for processing the target business and dependencies between the target microservices from the service pool based on the requirement configuration information of the target business and the service configuration information of each of the microservices in the service pool, and construct a directed acyclic graph corresponding to the target business based on the dependencies between the target microservices required for processing the target business. Then, the management server packages the directed acyclic graph and the requirement configuration information corresponding to the target business, and the service configuration information of each of the target microservices required for processing the target business, generates a business data file of the target business, and transmits the business data file to the business server, thereby completing arrangement of the microservices. Further, the management server may further transmit the directed acyclic graph for the target business to the client for the client to show the directed acyclic graph to the developer so that the developer can implement data analysis, business operation and maintenance processing, call modification, and the like based on the visualized directed acyclic graph, and each modification is traceable, and blood relationships between the different microservices are clearly visible.

As shown in FIG. 10, when the target business needs to be executed, the business party may transmit a business request for the target business to the business server via the client. In response to the business request, the business server loads the business data file of the target business into an internal memory and parses the business data file to obtain the directed acyclic graph and the requirement configuration information of the target business. Of course, the business data file can further be parsed to obtain the service configuration information of each of the target microservices required for processing the target business. Further, the business server optimizes the directed acyclic graph based on respective values of one or more service output parameters of each of the one or more called microservice recorded in the context information, then calls the target microservice based on the optimized directed acyclic graph to obtain and write the respective values of the one or more service output parameter corresponding to the target microservice into the context information, and finally returns response data corresponding to the business request to the business party based on the context information and one or more target service output parameters for the target business, thereby completing calling of the microservices to complete processing for the target business.

Figure 11:
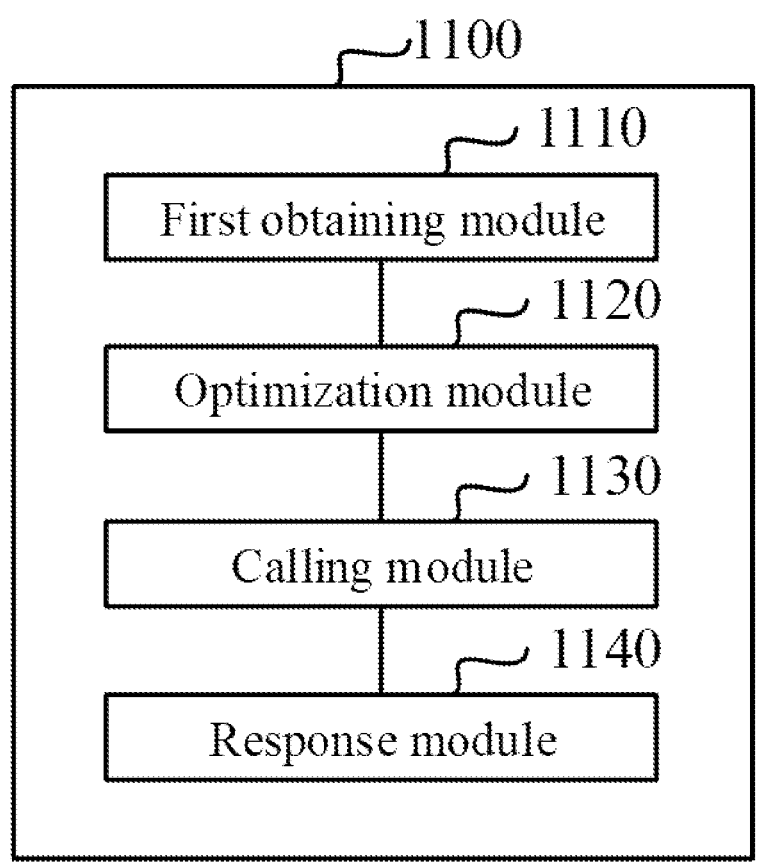
FIG. 11 is a schematic block diagram of a data processing apparatus according to some embodiments of the present application.

Additionally, in accordance with the data processing method shown in FIG. 2, another embodiment of the present application further provides a data processing apparatus. Referring to FIG. 11, the data processing apparatus 1100 provided in some embodiments of the present application can include: a first obtaining module 1110 for obtaining a directed acyclic graph for a target business and one or more target service output parameters for the target business in response to a business request for the target business; an optimization module 1120 for optimizing the directed acyclic graph based on context information, where the context information includes respective values of one or more service output parameters of each of one or more called microservices in a service pool; a calling module 1130 for calling target microservices based on the optimized directed acyclic graph to obtain respective values of one or more service output parameters of each of the target microservices, and writing the obtained respective values of the one or more service output parameters of the each of the target microservices into the context information; and a response module 1140 for returning response data corresponding to the business request based on the context information and the one or more target service output parameters; where the directed acyclic graph includes nodes respectively corresponding to the target microservices and one or more directed edges between the nodes, each of the one or more directed edges represents a dependency between two ones of the nodes connected by the each of the one or more directed edges, and the target microservices include ones of microservices in the service pool required for processing the target business.

Alternatively, the optimization module 1120 includes an optimization submodule for, if respective values of one or more service output parameters of one of the target microservices corresponding to one of the nodes in the directed acyclic graph exists in the context information, clipping other one or more of the nodes on which the one of the nodes depends to obtain the optimized directed acyclic graph.

Alternatively, the calling module is configured to: repeatedly perform processes as follows until all of the target microservices required for processing the target business have been called: selecting, from the optimized directed acyclic graph, one of the nodes whose indegree meets a preset calling condition as a first start node, and determining other one of the nodes in the optimized directed acyclic graph depending on the first start node as a first end node; calling a first start target microservice to obtain respective values of one or more service output parameters of the first start target microservice, where the first start target microservice is one of the target microservices corresponding to the first start node; and in response to determining that the first start target microservice is successfully called, updating an indegree of the first end node.

Alternatively, the calling module is further configured to, in response to determining that the first start target microservice is not successfully called, obtain respective types of one or more service input parameters of a first end target microservice, where the respective types of the one or more service input parameters include a type of necessary service input parameter and a type of unnecessary service input parameter, and the first end target microservice is one of the target microservices corresponding to the first end node; in response to determining, based on the respective types of the one or more service input parameters of the first end target microservice, that the one or more service output parameters of the first start target microservice belong to the type of necessary service input parameter of the first end target microservice, remain the indegree of the first end node unchanged, or in response to determining, based on the respective types of the one or more service input parameters of the first end target microservice, that the one or more service output parameters of the first start target microservice belong to the type of unnecessary service input parameter of the first end target microservice, update the indegree of the first end node.

Alternatively, the calling module is further configured to: obtain a history call record for the first start target microservice before calling the first start target microservice; and in response to determining that the history call record meets a preset fusing condition, suspend calling of the first start target microservice.

Alternatively, the calling module is further configured to: obtain a history call record for the first start target microservice before calling the first start target microservice; in response to determining that the history call record meets a preset degradation condition, suspend calling of the first start target microservice and perform a call degradation processing corresponding to the first start target microservice based on a degradation policy corresponding to the first start target microservice, where the call degradation processing includes at least one of: calling a standby microservice of the microservices in the service pool corresponding to the first start target microservice; or taking respective preset initial values of the one or more service output parameters of the first start target microservice as respective values of one or more service input parameters of a first end target microservice, where the first end target microservice is one of the target microservices corresponding to the first end node.

Alternatively, the apparatus further includes a first determining module for, before obtaining the directed acyclic graph for the target business and the one or more target service output parameters for the target business, determining the target microservices required for processing the target business and dependencies between the target microservices from the service pool based on requirement configuration information of the target business and service configuration information of each of the microservices in the service pool; and a construction module for constructing the directed acyclic graph for the target business based on the target microservices and the dependencies, where the requirement configuration information includes the one or more target service output parameters for the target business, and the service configuration information of the each of the microservices includes one or more service input parameters and one or more service output parameters of the each of the microservices.

Alternatively, the first determining module is configured to repeatedly perform following operations until all of the target microservices required for processing the target business have been obtained: determining, based on the one or more service output parameters of each of the microservices in the service pool, one of the microservices in the service pool having the one or more target service output parameters as one of the target microservices required for processing the target business; taking the determined one of the target microservices as a second start target microservice; determining one of the microservices in the service pool having one or more service output parameters which belong to one or more service input parameters of the second start target microservice, as a second end target microservice on which the second start target microservices depend; and taking the second end target microservice as a new second start target microservice.

Alternatively, the requirement configuration information further includes one or more target service input parameters for the target business, and the first determining module is further configured to: before taking the determined one of the target microservices as the second start target microservice, determine that one or more service input parameters of the second start target microservice do not belong to the one or more target service input parameters.

Alternatively, the construction module is configured to: construct the nodes respectively corresponding to the target microservices required for processing the target business based on the target microservices; and construct one of the one or more directed edges between every two of the nodes respectively corresponding to two of the target microservices dependent on each other based on the dependencies.

Obviously, the data processing apparatus according to the embodiment of the present application can be used as an execution body of the data processing method shown in FIG. 2.

Figure 12:
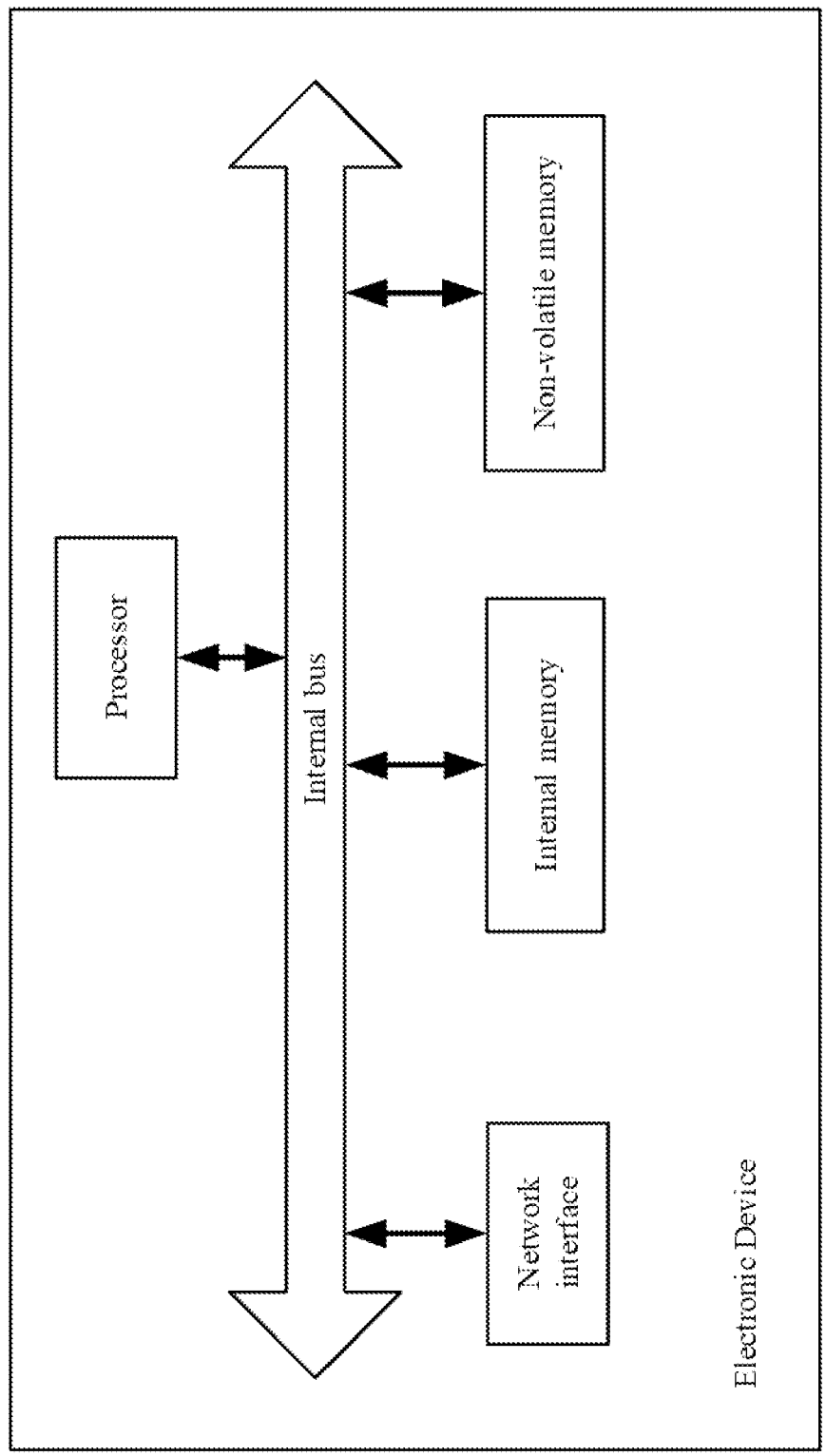
FIG. 12 is a schematic block diagram of an electronic device according to some embodiments of the present application.

FIG. 12 is a schematic block diagram of an electronic device according to some embodiments of the present application. Referring to FIG. 12, at a hardware level, the electronic device may include a processor, and optionally further include an internal bus, a network interface, and a memory. The memory may include an internal memory, such as a Random-Access Memory (RAM), or may further include a non-volatile memory, such as at least one disk memory. Of course, the electronic device may further include a hardware required for other business.

The processor, the network interface and the memory may be interconnected by an internal bus, which may be an Industry Standard Architecture (ISA) bus, a Peripheral Component Interconnect (PCI) bus or an Extended Industry Standard Architecture (EISA) bus, etc. The bus may be divided into an address bus, a data bus, a control bus, and the like. For ease of illustration, only one bi-directional arrow is shown in FIG. 12, but does not indicate that there is only one bus or one type of bus.

The memory is configured to store a computer program. Specifically, the program may include a program code including computer operation instructions. The memory may include an internal memory and non-volatile memory, and provides instructions and data to the processor.

The processor reads corresponding computer program into the internal memory from the non-volatile memory and then runs the computer program to form the data processing device at a logical level. The processor, when the program stored in the memory is executed by the processor, performs following operations: obtaining a directed acyclic graph for a target business and one or more target service output parameters for the target business in response to a business request for the target business; optimizing the directed acyclic graph based on context information, where the context information includes respective values of one or more service output parameters of each of one or more called microservices in a service pool; calling target microservices based on the optimized directed acyclic graph to obtain respective values of one or more service output parameters of each of the target microservices, and writing the obtained respective values of the one or more service output parameters of the each of the target microservices into the context information; and returning response data corresponding to the business request based on the context information and the one or more target service output parameters; where the directed acyclic graph includes nodes respectively corresponding to the target microservices and one or more directed edges between the nodes, each of the one or more directed edges represents a dependency between two of the nodes connected by the each of the one or more directed edges, and the target microservices include ones of microservices in the service pool required for processing the target business.

The method described above as shown in FIG. 2 of the present application may be applied to or implemented by the processor. The processor may be an integrated circuit chip having signal processing capabilities. In an implementation, the steps of the above method may be performed by integrated logic circuits of hardware in the processor or by instructions in the form of a software. The processor may be a general-purpose processor, including a Central Processing Unit (CPU), a Network Processor (NP), and the like; may also be a Digital Signal Processor (DSP), an Application Specific Integrated Circuit (ASIC), a Field-Programmable Gate Array (FPGA) or other programmable logic device, a discrete gate or transistor logic device, or a discrete hardware component. The methods, steps, and logical block diagrams disclosed in the embodiments of the present application may be implemented or performed. The general purpose processor may be a microprocessor or the processor may be any conventional processor or the like. The steps associated with the method disclosed in the embodiments of the present application may be embodied directly as being performed by a hardware decoding processor, or may be performed by a combination of a hardware and a software module in the decoding processor. The software module may be located in a storage medium matured in the art, such as a random access memory, a flash memory, a read only memory, a programmable read only memory, or an electrically erasable programmable memory, a register, or the like. The storage medium is located in the memory, and the processor reads information stored in the memory and performs the steps of the above method in conjunction with its hardware.

The electronic device may further perform the method shown in FIG. 2, which is not repeated described herein.

Of course, the electronic device of the present application does not exclude other implementations other than a software implementation, such as a logic device or a combination of a software and a hardware, which means that the execution body of the following process flow is not limited to the respective logic unit, but may be the hardware or the logic device.

Yet another embodiment of the present application further provides a non-transitory computer readable storage medium storing one or more programs, where the one or more programs include instructions that, when executed by an electronic device including a plurality of application programs, enable the electronic device to perform the method shown in FIG. 2 and configured to perform following operations, including: obtaining a directed acyclic graph for a target business and one or more target service output parameters for the target business in response to a business request for the target business; optimizing the directed acyclic graph based on context information, where the context information includes respective values of one or more service output parameters of each of one or more called microservices in a service pool; calling target microservices based on the optimized directed acyclic graph to obtain respective values of one or more service output parameters of each of the target microservices, and writing the obtained respective values of the one or more service output parameters of the each of the target microservices into the context information; and returning response data corresponding to the business request based on the context information and the one or more target service output parameters; where the directed acyclic graph includes nodes respectively corresponding to the target microservices and one or more directed edges between the nodes, each of the one or more directed edges represents a dependency between two of the nodes connected by the each of the one or more directed edges, and the target microservices include ones of microservices in the service pool required for processing the target business.

The system, apparatus, module or unit set forth in the above embodiments may be embodied by a computer chip or entity or by a product having a certain function. A typical implementation device is a computer. Specifically, the computer may be, for example, a personal computer, a laptop computer, a cellular phone, a camera phone, a smart phone, a personal digital assistant, a media player, a navigation device, an email device, a game console, a tablet computer, a wearable device, or a combination of any of these devices.

The Computer readable media includes permanent and non-permanent, removable and non-removable media, which may be implemented for information storage by any method or technique. The information may be computer readable instructions, data structures, modules of a program, or other data. Examples of the computer storage media include, but are not limited to, phase change memory (PRAM), static random access memory (SRAM), dynamic random access memory (DRAM), other types of random access memory (RAM), read only memory (ROM), electrically erasable programmable read only memory (EEPROM), flash memory or other memory technology, read only optical disk read only memory (CD-ROM), digital versatile disks (DVD) or other optical storage, magnetic cassette tape, magnetic disk storage or other magnetic storage devices, or any other non-transmission medium that can be used to store information that can be accessed by a computing device. As defined herein, the computer readable medium does not include a transitory media, such as a modulated data signal and a carrier wave.

It is also noted that the terms "comprises," "comprising," or any other variation thereof, are intended to cover a non-exclusive inclusion, such that a process, method, article, or apparatus that comprises a list of elements includes not only those elements but also other elements not expressly listed, or also includes elements inherent to such process, method, article, or apparatus. Without more limitations, an element defined by a statement "include at least one of" does not rule out additional identical elements included in a process, method, article, or apparatus that includes the element.

Some embodiments of the present application have been described above. Other embodiments are within the scope of the appended claims. In some cases, the acts or steps recited in the claims may be performed in an order different from that in the embodiments and the desired results may still be achieved. In addition, the processes depicted in the drawings do not necessarily require the particular order or sequential order shown to achieve the desired results. In certain embodiments, multitasking and parallel processing are also possible or may be advantageous. Any modifications, equivalents, modifications and the like, which fall within the spirit and principles of the present application, are intended to be included within the scope of the present application.

What is claimed is:

1. A data processing method, comprising:
    obtaining a directed acyclic graph for a target business and one or more target service output parameters for the target business in response to a business request for the target business;
    optimizing the directed acyclic graph based on context information, wherein the context information comprises respective values of one or more service output parameters of each of one or more called microservices in a service pool;
    calling target microservices based on the optimized directed acyclic graph to obtain respective values of one or more service output parameters of each of the target microservices, and writing the obtained respective values of the one or more service output parameters of the each of the target microservices into the context information; and
    returning response data corresponding to the business request based on the context information and the one or more target service output parameters,
    wherein the directed acyclic graph comprises nodes respectively corresponding to the target microservices and one or more directed edges between the nodes, each of the one or more directed edges represents a dependency between two ones of the nodes connected by the each of the one or more directed edges, and the target microservices comprise ones of microservices in the service pool required for processing the target business.

2. The method of claim 1, wherein the optimizing of the directed acyclic graph based on the context information comprises:
    in response to determining that respective values of one or more service output parameters of one of the target microservices corresponding to one of the nodes in the directed acyclic graph exists in the context information, clipping other one or more of the nodes on which the one of the nodes depends to obtain the optimized directed acyclic graph.

3. The method of claim 1, wherein the calling of the target microservices based on the optimized directed acyclic graph comprises:
    repeatedly performing processes as follows until all of the target microservices required for processing the target business have been called:
        selecting, from the optimized directed acyclic graph, one of the nodes whose indegree meets a preset calling condition as a first start node, and determining other one of the nodes in the optimized directed acyclic graph depending on the first start node as a first end node;
        calling a first start target microservice to obtain respective values of one or more service output parameters of the first start target microservice, wherein the first start target microservice is one of the target microservices corresponding to the first start node; and
        in response to determining that the first start target microservice is successfully called, updating an indegree of the first end node.

4. The method of claim 3, wherein the calling of the target microservices based on the optimized directed acyclic graph further comprises:
    in response to determining that the first start target microservice is not successfully called, obtaining respective types of one or more service input parameters of a first end target microservice, wherein the respective types of the one or more service input parameters comprise a type of necessary service input parameter and a type of unnecessary service input parameter, and the first end target microservice is one of the target microservices corresponding to the first end node; and
    in response to determining, based on the respective types of the one or more service input parameters of the first end target microservice, that the one or more service output parameters of the first start target microservice belong to the type of necessary service input parameter of the first end target microservice, remaining the indegree of the first end node unchanged, or in response to determining, based on the respective types of the one or more service input parameters of the first end target microservice, that the one or more service output parameters of the first start target microservice belong to the type of unnecessary service input parameter of the first end target microservice, updating the indegree of the first end node.

5. The method of claim 3, wherein the calling of the target microservices based on the optimized directed acyclic graph further comprises:
    obtaining a history call record for the first start target microservice before calling the first start target microservice; and
    in response to determining that the history call record meets a preset fusing condition, suspending calling of the first start target microservice.

6. The method of claim 3, wherein the calling of the target microservices based on the optimized directed acyclic graph further comprises:
    obtaining a history call record for the first start target microservice before calling the first start target microservice; and
    in response to determining that the history call record meets a preset degradation condition, suspending calling of the first start target microservice and performing a call degradation processing corresponding to the first start target microservice based on a degradation policy corresponding to the first start target microservice,
    wherein the call degradation processing comprises at least one of:
    calling a standby microservice of the microservices in the service pool corresponding to the first start target microservice; or
    taking respective preset initial values of the one or more service output parameters of the first start target microservice as respective values of one or more service input parameters of a first end target microservice, wherein the first end target microservice is one of the target microservices corresponding to the first end node.

7. The method of claim 1, further comprising: before obtaining the directed acyclic graph for the target business and the one or more target service output parameters for the target business,
  determining the target microservices required for processing the target business and dependencies between the target microservices from the service pool based on requirement configuration information of the target business and service configuration information of each of the microservices in the service pool; and
  constructing the directed acyclic graph for the target business based on the target microservices and the dependencies,
  wherein the requirement configuration information comprises the one or more target service output parameters for the target business, and the service configuration information of the each of the microservices comprises one or more service input parameters and one or more service output parameters of the each of the microservices.

8. The method of claim 7, wherein the determining of the target microservices and the dependencies comprises:
  repeatedly performing processes as follows until all of the target microservices required for processing the target business have been obtained:
    determining, based on the one or more service output parameters of each of the microservices in the service pool, one of the microservices in the service pool having the one or more target service output parameters as one of the target microservices required for processing the target business;
    taking the determined one of the target microservices as a second start target microservice;
    determining one of the microservices in the service pool having one or more service output parameters which belong to one or more service input parameters of the second start target microservice, as a second end target microservice on which the second start target microservices depend; and
    taking the second end target microservice as a new second start target microservice.

9. The method of claim 8, wherein the requirement configuration information further comprises one or more target service input parameters for the target business, and
  the method further comprises: before taking the determined one of the target microservices as the second start target microservice, determining that one or more service input parameters of the second start target microservice do not belong to the one or more target service input parameters.

10. The method of claim 7, wherein the constructing of the directed acyclic graph for the target business based on the target microservices and the dependencies comprises:
  constructing the nodes respectively corresponding to the target microservices required for processing the target business based on the target microservices; and
  constructing one of the one or more directed edges between every two of the nodes respectively corresponding to two of the target microservices dependent on each other based on the dependencies.

11. An electronic device, comprising:
  a processor; and
  a memory storing instructions executable by the processor to perform operations comprising:
    obtaining a directed acyclic graph for a target business and one or more target service output parameters for the target business in response to a business request for the target business;
    optimizing the directed acyclic graph based on context information, wherein the context information comprises respective values of one or more service output parameters of each of one or more called microservices in a service pool;
    calling target microservices based on the optimized directed acyclic graph to obtain respective values of one or more service output parameters of each of the target microservices, and writing the obtained respective values of the one or more service output parameters of the each of the target microservices into the context information; and
    returning response data corresponding to the business request based on the context information and the one or more target service output parameters,
  wherein the directed acyclic graph comprises nodes respectively corresponding to the target microservices and one or more directed edges between the nodes, each of the one or more directed edges represents a dependency between two of the nodes connected by the each of the one or more directed edges, and the target microservices comprise ones of microservices in the service pool required for processing the target business.

12. The electronic device of claim 11, wherein the optimizing of the directed acyclic graph based on the context information comprises:
  in response to determining that respective values of one or more service output parameters of one of the target microservices corresponding to one of the nodes in the directed acyclic graph exists in the context information, clipping other one or more of the nodes on which the one of the nodes depends to obtain the optimized directed acyclic graph.

13. The electronic device of claim 11, wherein the calling of the target microservices based on the optimized directed acyclic graph comprises:
  repeatedly performing processes as follows until all of the target microservices required for processing the target business have been called:
    selecting, from the optimized directed acyclic graph, one of the nodes whose indegree meets a preset calling condition as a first start node, and determining other one of the nodes in the optimized directed acyclic graph depending on the first start node as a first end node;
    calling a first start target microservice to obtain respective values of one or more service output parameters of the first start target microservice, wherein the first start target microservice is one of the target microservices corresponding to the first start node; and
    in response to determining that the first start target microservice is successfully called, updating an indegree of the first end node.

14. The electronic device of claim 13, wherein the calling of the target microservices based on the optimized directed acyclic graph further comprises:
  in response to determining that the first start target microservice is not successfully called, obtaining respective types of one or more service input parameters of a first end target microservice, wherein the respective types of the one or more service input parameters comprise a type of necessary service input parameter and a type of unnecessary service input parameter, and the first end target microservice is one of the target microservices corresponding to the first end node; and in response to determining, based on the respective types of the one or more service input parameters of the first end target microservice, that the one or more service output parameters of the first start target microservice belong to the type of necessary service input parameter of the first end target microservice, remaining the indegree of the first end node unchanged, or in response to determining, based on the respective types of the one or more service input parameters of the first end target microservice, that the one or more service output parameters of the first start target microservice belong to the type of unnecessary service input parameter of the first end target microservice, updating the indegree of the first end node.

15. The electronic device of claim 13, wherein the calling of the target microservices based on the optimized directed acyclic graph further comprises:

obtaining a history call record for the first start target microservice before calling the first start target microservice; and in response to determining that the history call record meets a preset fusing condition, suspending calling of the first start target microservice.

16. The electronic device of claim 13, wherein the calling of the target microservices based on the optimized directed acyclic graph further comprises:

obtaining a history call record for the first start target microservice before calling the first start target microservice; and in response to determining that the history call record meets a preset degradation condition, suspending calling of the first start target microservice and performing a call degradation processing corresponding to the first start target microservice based on a degradation policy corresponding to the first start target microservice, wherein the call degradation processing comprises at least one of:

calling a standby microservice of the microservices in the service pool corresponding to the first start target microservice; or taking respective preset initial values of the one or more service output parameters of the first start target microservice as respective values of one or more service input parameters of a first end target microservice, wherein the first end target microservice is one of the target microservices corresponding to the first end node.

17. The electronic device of claim 11, wherein the operations further comprise: before obtaining the directed acyclic graph for the target business and the one or more target service output parameters for the target business, determining the target microservices required for processing the target business and dependencies between the target microservices from the service pool based on requirement configuration information of the target business and service configuration information of each of the microservices in the service pool; and constructing the directed acyclic graph for the target business based on the target microservices and the dependencies, wherein the requirement configuration information comprises the one or more target service output parameters for the target business, and the service configuration information of the each of the microservices comprises one or more service input parameters and one or more service output parameters of the each of the microservices.

18. The electronic device of claim 17, wherein the determining of the target microservices and the dependencies comprises:

repeatedly performing processes as follows until all of the target microservices required for processing the target business have been obtained:

determining, based on the one or more service output parameters of each of the microservices in the service pool, one of the microservices in the service pool having the one or more target service output parameters as one of the target microservices required for processing the target business;

taking the determined one of the target microservices as a second start target microservice;

determining one of the microservices in the service pool having one or more service output parameters which belong to one or more service input parameters of the second start target microservice, as a second end target microservice on which the second start target microservices depend; and taking the second end target microservice as a new second start target microservice.

19. The electronic device of claim 18, wherein the requirement configuration information further comprises one or more target service input parameters for the target business, and the operations further comprise: before taking the determined one of the target microservices as the second start target microservice, determining that one or more service input parameters of the second start target microservice do not belong to the one or more target service input parameters.

20. A non-transitory computer readable storage medium storing instructions executable by a processor of an electronic device to perform operations comprising:

obtaining a directed acyclic graph for a target business and one or more target service output parameters for the target business in response to a business request for the target business;

optimizing the directed acyclic graph based on context information, wherein the context information comprises respective values of one or more service output parameters of each of one or more called microservices in a service pool;

calling target microservices based on the optimized directed acyclic graph to obtain respective values of one or more service output parameters of each of the target microservices, and writing the obtained respective values of the one or more service output parameters of the each of the target microservices into the context information; and returning response data corresponding to the business request based on the context information and the one or more target service output parameters, wherein the directed acyclic graph comprises nodes respectively corresponding to the target microservices and one or more directed edges between the nodes, each of the one or more directed edges represents a dependency between two of the nodes connected by the each of the one or more directed edges, and the target microservices comprise ones of microservices in the service pool required for processing the target business.

* * * * *